US008874586B1

(12) United States Patent
Sommers et al.

(10) Patent No.: US 8,874,586 B1
(45) Date of Patent: Oct. 28, 2014

(54) AUTHORITY MANAGEMENT FOR ELECTRONIC SEARCHES

(75) Inventors: Michael Sommers, Leesburg, VA (US); Harmannus Vandermolen, Leesburg, VA (US)

(73) Assignee: AOL Inc., Dulles, VA (US)

( * ) Notice: Subject to any disclaimer, the term of this patent is extended or adjusted under 35 U.S.C. 154(b) by 1279 days.

(21) Appl. No.: 11/548,055

(22) Filed: Oct. 10, 2006

Related U.S. Application Data

(60) Provisional application No. 60/820,020, filed on Jul. 21, 2006, provisional application No. 60/820,885, filed on Jul. 31, 2006.

(51) Int. Cl.
G06F 7/00 (2006.01)
G06F 17/30 (2006.01)

(52) U.S. Cl.
USPC .......................................... 707/748; 707/758

(58) Field of Classification Search
USPC .................. 707/718, 722–723, 748, 758, 770
See application file for complete search history.

(56) References Cited

U.S. PATENT DOCUMENTS

| | | | |
|---|---|---|---|
| 5,751,286 A | 5/1998 | Barber et al. | |
| 5,828,839 A | 10/1998 | Moncreiff | |
| 5,835,087 A | 11/1998 | Herz et al. | |
| 6,049,806 A | 4/2000 | Crecine | |
| 6,112,203 A | 8/2000 | Bharat et al. | |
| 6,385,602 B1 * | 5/2002 | Tso et al. .......................... | 707/3 |
| 6,681,370 B2 | 1/2004 | Gounares et al. | |
| 6,691,106 B1 | 2/2004 | Sathyanarayan | |
| 6,823,370 B1 | 11/2004 | Kredo et al. | |
| 6,901,207 B1 | 5/2005 | Watkins | |
| 7,209,942 B1 | 4/2007 | Hori et al. | |
| 7,281,220 B1 | 10/2007 | Rashkovskiy | |
| 7,367,043 B2 | 4/2008 | Dudkiewicz et al. | |
| 7,440,976 B2 * | 10/2008 | Hart et al. ............................ | 1/1 |
| 2002/0069218 A1 | 6/2002 | Sull et al. | |
| 2002/0133826 A1 | 9/2002 | Ohyama | |
| 2002/0184336 A1 | 12/2002 | Rising, III | |
| 2003/0093790 A1 | 5/2003 | Logan et al. | |
| 2003/0182220 A1 | 9/2003 | Galant | |
| 2003/0235407 A1 | 12/2003 | Lord | |
| 2004/0098754 A1 | 5/2004 | Vella et al. | |
| 2004/0114571 A1 | 6/2004 | Timmins et al. | |

(Continued)

OTHER PUBLICATIONS

Agichtein et al. "Improving Web Search Ranking by Incorporating User Behavior Information", SIGIR'06, Aug. 6-11, 2006, Seattle, Washington, USA.Copyright 2006 ACM.*

(Continued)

*Primary Examiner* — Sherief Badawi
*Assistant Examiner* — Berhanu Mitiku
(74) *Attorney, Agent, or Firm* — Finnegan, Henderson, Farabow, Garrett & Dunner LLP

(57) ABSTRACT

A presentation of search results may be improved. An indication that identifies a user may be received. A search authority model may be formed to represent information related to the user. A search query may be received from a searching user. Search results may be determined based on the terms included within the search query and the search results may be ranked or grouped based on the search authority model. Additionally, or alternatively, the search query may be adjusted based on the search authority model and search results may be determined based on the adjusted search query. In either case, the search results may be made perceivable to the searching user.

16 Claims, 10 Drawing Sheets

(56) References Cited

U.S. PATENT DOCUMENTS

| | | | |
|---|---|---|---|
| 2005/0091694 A1 | 4/2005 | Rambo | |
| 2005/0114324 A1 | 5/2005 | Mayer | |
| 2005/0114449 A1 | 5/2005 | Verhaeghe et al. | |
| 2005/0128361 A1 | 6/2005 | Li et al. | |
| 2005/0144086 A1 | 6/2005 | Speiser et al. | |
| 2006/0059134 A1 | 3/2006 | Palmon et al. | |
| 2006/0071950 A1 | 4/2006 | Kurtzweil et al. | |
| 2006/0167857 A1* | 7/2006 | Kraft et al. | 707/3 |
| 2006/0167864 A1* | 7/2006 | Bailey et al. | 707/3 |
| 2006/0179051 A1 | 8/2006 | Whitney et al. | |
| 2006/0218573 A1 | 9/2006 | Proebstel | |
| 2006/0224552 A1* | 10/2006 | Riezler et al. | 707/1 |
| 2007/0005564 A1* | 1/2007 | Zehner | 707/2 |
| 2007/0088603 A1* | 4/2007 | Jouppi et al. | 705/14 |
| 2007/0094247 A1 | 4/2007 | Chowdhury et al. | |
| 2007/0112817 A1* | 5/2007 | Danninger | 707/101 |
| 2007/0130563 A1 | 6/2007 | Elgazzar et al. | |
| 2007/0156677 A1* | 7/2007 | Szabo | 707/5 |
| 2007/0174237 A1* | 7/2007 | Wilbrink et al. | 707/3 |
| 2007/0208719 A1* | 9/2007 | Tran | 707/3 |
| 2007/0226183 A1* | 9/2007 | Hart et al. | 707/3 |
| 2007/0261099 A1* | 11/2007 | Broussard et al. | 726/1 |
| 2007/0300258 A1 | 12/2007 | O'Connor et al. | |
| 2008/0005118 A1* | 1/2008 | Shakib et al. | 707/10 |
| 2008/0155627 A1 | 6/2008 | O'Connor et al. | |

OTHER PUBLICATIONS

Joho et al. "Effectiveness of Additional Representations for the Search Result Presentation on the Web" Joho, H. and Jose, J. M. (2005). A Comparative Study of the Effectiveness of Search Result Presentation on the Web. In: Lalmas, M., et al. (Eds.) Advances in Information Retrieval, 28th European Conference on Information Retrieval, pp. 302-313, L.*

Lang "A tolerance rough set approach to clustering web search results" Institute of Mathematics Faculty of Mathematics, Informatics and Mechanics Warsaw University, Dec. 2003.*

Adamic et al. "How to search a social network" Social Networks 27 (2005) 187-203, HP Labs, 1501 Page Mill Road, Palo Alto, CA 94304, USA www.elsevier.com/locate/socnet © 2005 Elsevier B.V. All rights reserved.*

Baker L. "Blinkx.TV: More Video Than Google Yahoo or YouTube" Search Engine Journal Jun. 14 2006 pp. 1-7 http://www.searchenginjournal.com/blinkxtv-more-video-than-google-yahoo-or-myspace/3532/(Visited Mar. 5, 2008).

USPTO Final Office Action in U.S. Appl. No. 11/538,383, mailed Jul. 21, 2009, 32 pages.

Notice of Allowance in U.S. Appl. No. 11/538,620, mailed Jul. 13, 2009, 11 pages.

Notice of Allowance in U.S. Appl. No. 11/538,729, mailed Jul. 15, 2009, 8 pages.

International Search Report issued in International Application No. PCT/US07/73999, dated Jul. 7, 2008, 8 pages.

* cited by examiner

Search Authority Feature Vector

| Topic | Past Search Terms (with weights) | Past Search Results | Past Clicked-Through Search Results | Web Pages Browsed | Terms from Web Pages Browsed | Expert-Provided Profile |
|---|---|---|---|---|---|---|
| 311 | 312 | 313 | 314 | 315 | 316 | 317 |

310

Document Feature Vector

| Doc Term 1 | Doc Term 2 | Doc Term 1 Frequency | Doc Term 2 Frequency | Doc Length | Doc Source | Doc Publication Date |
|---|---|---|---|---|---|---|
| 321 | 322 | 323 | 324 | 325 | 326 | 327 |

320

Query Feature Vector

| Query Term 1 | Query Term 2 | Query Length | Date Query Entered | Searching User | Searching User/Expert Feature Vector |
|---|---|---|---|---|---|
| 331 | 332 | 333 | 334 | 335 | 336 |

AUTHORITY MANAGEMENT FOR ELECTRONIC SEARCHES

CROSS REFERENCE TO RELATED APPLICATIONS

This application claims the benefit of U.S. Provisional Application No. 60/820,020, filed Jul. 21, 2006 and titled "Authority Management", and U.S. Provisional Application No. 60/820,885, filed Jul. 31, 2006 and titled "Authority Management for Electronic Searches", both of which are incorporated herein by reference in their entirety.

TECHNICAL FIELD

This description relates to authority management for electronic searches.

BACKGROUND

Users seeking information may sometimes reference the world wide web or the Internet. To do so, the user may enter a search query into a search engine and, in response, may receive search results that are relevant to the search query. If the user seeks search results in a particular format, such as, for example, audio or video search results, a user may enter one of the words "audio" or "video" in the search query along with words that relate to the content the user seeks.

SUMMARY

In a first general aspect, a presentation of search results is improved. An indication that identifies a user is received. A search authority model is formed to represent information related to the user. A search query is received from a searching user. Search results are determined based on the terms included within the search query. The search results are ranked or grouped based on the search authority model. The search results are made perceivable to the searching user.

With respect to at least the first general aspect, implementations may include one or more of the following features. For example, forming a search authority model may include retrieving past search queries entered by the user and related to the topic, extracting search terms and search results associated with the past search queries, extracting an indication of search results associated with the past search queries that were selected by the user and an indication of documents corresponding to the selected search results, combining the past search queries, search terms, search results, selected search results, and documents corresponding to the selected search results, and forming a search authority model based on the combined information. An editor-created model may be received for the topic. Information included in the editor-created model may be added to the combined information to form the search authority model.

Forming a search authority model may include retrieving web pages browsed by the user and related to the topic, extracting uniform resource locator (URL) information associated with the browsed web pages, extracting key terms from the browsed web pages, combining the browsed web pages, URLs and key terms, and forming a search authority model based on the combined information. An editor-created model may be received for the topic. Information included in the editor-created model may be added to the combined information to form the search authority model.

Forming a search authority model may include retrieving an interest profile provided by the user, extracting terms stored in the interest profile and related to the topic, extracting web pages stored in the interest profile and related to the topic, combining the extracted terms and web pages, and forming a search authority model based on the combined information. An editor-created model may be received for the topic. Information included in the editor-created model may be added to the combined information to form the search authority model.

Ranking the search results based on the search authority model may include forming search result models for each of the search results, a search result model including terms from within documents corresponding to the search result and information about the search result and ranking the search results based on a comparison of the search authority model and each of the search result models. The comparison of the search authority model and each of the search result models may include determining a distance between features associated with the models and/or determining an angle between features associated with the models.

Ranking the search results based on the search authority model may include restricting the search results to web pages accessed by the user. Ranking the search results based on the search authority model may include restricting the search results to web pages accessed by the user and web pages that are similar to the accessed web pages. Ranking the search results based on the search authority model may include visually distinguishing search results that have been accessed by the user from other search results.

An indication of more than one user that has an expertise in a particular topic may be received. A temporary model may be formed to represent the expertise of each user. The temporary models may be combined and a search authority model may be formed based on the combined temporary models. Combining the temporary models may include adding features associated with the temporary models and/or determining a centroid or aggregate model based on the temporary models. The centroid model may be determined based on a clustering technique and/or by determining a weighted average of features associated with the temporary models.

The identified user may be a user having an expertise in a topic and the information related to the user may be a representation of the user's expertise. Receiving an indication of a user may include receiving an indication of a user who has been selected by the searching user as having an expertise in a particular topic. Receiving an indication of a user may include determining a user to be used as a search authority for the searching user based on one or more criteria provided by the searching user. The criteria provided by the searching user may include wide recognition as having expertise on the topic, strong electronic presence related to the topic, strong history of topic-related search queries and web browsing, membership in the user's community and/or votes by others indicating expertise.

Receiving an indication of a user may include determining more than one user to be used as a search authority for the user and removing at least one user from use as a search authority based on a veto by the searching user.

The search results may be re-ranked based on a selection by the searching user of one or more different search authorities.

An indication may be received from the searching user related to a weight for the search authority to be used in ranking the search results and/or a weight for an interest profile provided by the searching user to be used in ranking the search results.

Forming a search authority model to represent information related to the user may include forming a search authority feature vector to represent information related to the user. Forming a search authority model to represent information related to the user may include forming a collection of terms that represent information related to the user. At least one of the terms may be weighted based on a significance of the term in relation to the other terms included in the collection.

In a second general aspect, a presentation of search results is improved. An indication that identifies a user is received. A search authority model is formed to represent information related to the user. A search query is received from a searching user. The search query is adjusted based on the search authority model. Search results are determined based on the adjusted search query. The search results are made perceivable to the searching user.

With respect to at least the second general aspect, implementations may include one or more of the following features. For example, adjusting the search query may include identifying terms related to the search query from within the search authority model and adjusting the search query to include the identified terms.

Forming a search authority model to represent information related to the user may include forming a search authority feature vector to represent information related to the user. Forming a search authority model to represent information related to the user may include forming a collection of terms that represent information related to the user. At least one of the terms may be weighted based on a significance of the term in relation to the other terms included in the collection.

Implementations of any of the techniques described may include a method or process, an apparatus or system, or computer software on a computer-accessible medium. The details of particular implementations are set forth below. Other features will be apparent from the description and drawings, and from the claims.

DESCRIPTION OF DRAWINGS

FIG. 3 is an illustration of information included in a search authority feature vector, a document feature vector and a query feature vector.

DETAILED DESCRIPTION

Figure 1:
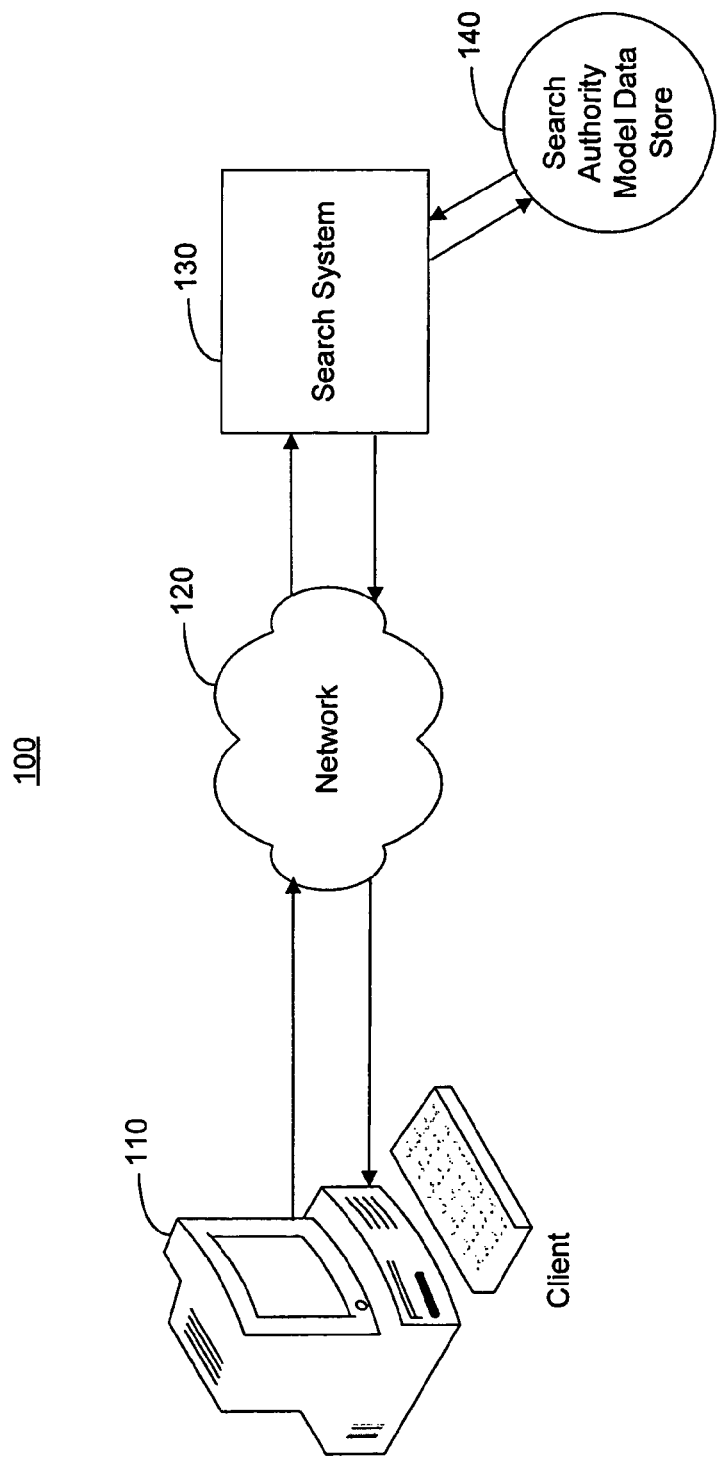
FIG. 1 is an exemplary communications system that includes a client connected to a search system through a network.

Search results for a query provided by a searching user may be determined based on terms within the query, a popularity associated with web pages or documents that are determined to match the query, and/or information included in an interest profile associated with the searching user. One way to improve search results is to take into account an interest profile of the searching user in an attempt to tailor or personalize the search results to the searching user's interests. Another way to improve search results is to let the searching user specify (or automatically specify for the searching user) a search authority for the search query. The search authority (also referred to, interchangeably, as an "expert" or an "authority user") is a person that the searching user deems to be an authority on, or has expertise in, a given topic. The expert's interest profile, as well as additional information associated with the expert's online behavior, may be used to create a search authority model. When determining search results for the searching user, the presently disclosed search system uses the search authority model to identify, rank and/or group the search results.

An expert may have provided an interest profile that includes areas of interest and gradations of interest within, and between, the given areas. In one example, an interest profile that is associated with an expert includes an indication of an interest in exercise, with a great amount of interest in running, a smaller amount of interest in bicycling, and no interest in swimming. Within one area of interest, the authority user indicates further interests, such as, for example, an interest in marathon and long-distance running. In this instance, the search authority model, which includes information associated with the expert's interest profile is used to inform the ranking of search results by, for example, ranking search results that are more similar to areas of great interest to the expert higher and ranking search results that are less similar to areas of great interest lower.

Moreover, additional search results are added, which otherwise may be excluded, if the search authority model indicates a connection between the search topics and the content of the additional search results. For example, a searching user may enter the search query "sneakers." If the search authority model for the running expert has been chosen to inform the search results provided in response to the "sneakers" query, a search system may provide more prominent display of search results related to running sneakers, and less prominent display of search results related to basketball sneakers. Furthermore, if the search authority model for the running expert includes a uniform resource locator (URL) for www.thebestrunningstuff.com, a search result associated with the web page may be provided in response to the "sneakers" query even though the web page did not have enough in common with "sneakers" (e.g., the page focuses on running gadgets, such as, for example, watches and electronic running logs) to be included in the search results absent the influence of the search authority model.

In some implementations, an expert's interest profile may be the only interest profile incorporated into a search authority model that may inform or influence search results for a particular query provided by a searching user. Additionally, or alternatively, a combination of information from within the expert's interest profile and a second expert's interest profile or the searching user's interest profile may be used to create a search authority model and inform and influence search results. The searching user (or the search system) may use a sliding scale to determine the extent of influence the (first or second) expert's interest profile and the searching user's interest profile, respectively, have on the search results. In some implementations, a searching user may use a search authority model that includes information associated with an expert's interest profile to re-rank, or modify, a group of search results that were already provided in response to a query entered by the searching user or in response to use of a different search authority model that includes information associated with a second expert's interest profile to rank or modify the search results in the first instance.

Communications system 100 of FIG. 1 includes a client 110 connected to a search system 130 through a network 120. The client 110 may be configured to receive a search query from a searching user. The client 110 may provide the search query through network 120 to the search system 130. In response, the search system 130 may determine that the query is related to a particular topic, and then determine and provide search results to the client 110 through the network 120.

Each of the client 110 and the search system 130 may be implemented by, for example, a general-purpose computer capable of responding to and executing instructions in a defined manner, a personal computer, a special-purpose computer, a workstation, a server, a device, a component, other equipment or some combination thereof capable of responding to and executing instructions. The client 110 and search system 130 may be configured to receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal that is capable of being delivered to the client 110 or the search system 130.

The client 110 may include one or more devices capable of accessing content on the search system 130. The search system 130 may include a general-purpose computer (e.g., a personal computer (PC)) capable of responding to and executing instructions in a defined manner, a workstation, a notebook computer, a PDA ("Personal Digital Assistant"), a wireless phone, a component, other equipment, or some combination of these items that is capable of responding to and executing instructions.

In one implementation, the client 110 includes one or more information retrieval software applications (e.g., a browser, a mail application, an instant messaging client, an Internet service provider client, a media player, or another integrated client) capable of receiving one or more data units. The information retrieval applications may run on a general-purpose operating system and a hardware platform that includes a general-purpose processor and specialized hardware for graphics, communications and/or other capabilities. In another implementation, the client 110 may include a wireless telephone running a micro-browser application on a reduced operating system with general purpose and specialized hardware capable of operating in mobile environments.

The network 120 includes hardware and/or software capable of enabling direct or indirect communications between the client 110 and the search system 130. As such, the network 120 may include a direct link between the client 110 and the search system 130, or it may include one or more networks or sub networks between them (not shown). Each network or sub network may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data.

The search system 130 may include a general-purpose computer having a central processor unit (CPU), and memory/storage devices that store data and various programs such as an operating system and one or more application programs. Other examples of a search system 130 includes a workstation, a server, a special purpose device or component, a broadcast system, other equipment, or some combination thereof capable of responding to and executing instructions in a defined manner. The search system 130 also may include an input/output (I/O) device (e.g., video and audio input and conversion capability), and peripheral equipment such as a communications card or device (e.g., a modem or a network adapter) for exchanging data with the network 120.

The search system 130 is generally capable of executing instructions under the command of a controller. The search system 130 may be used to provide content to the client 110. The controller may be implemented by a software application loaded on the search system 130 for commanding and directing communications exchanged with the client 110. Other examples of the controller include a program, a piece of code, an instruction, a device, a computer, a computer system, or a combination thereof, for independently or collectively instructing the client 110 or the search system 130 to interact and operate as described. The search system 130 may be embodied permanently or temporarily in any type of machine, component, physical or virtual equipment, storage medium, or propagated signal capable of providing instructions to the client 110 or the search system 130.

More particularly, the search results determined by the search system 130, and provided to client 110, may be informed by a search authority selected by, or for, the searching user. The search system 130 may access a search authority model data store 140 to determine a search authority model as selected by (or for) a searching user to inform queries related to the particular topic associated with the instant query. The search authority model may represent the interests or expertise of a particular search authority. The information in the determined search authority model may be used by the search system 130 to inform the search results in a variety of ways. For example, the search system 130 may restrict the search results to those that correspond to web pages that were previously accessed by the expert to whom the search authority model corresponds. Web pages similar to those previously accessed by the expert also may be included in the search results provided to the client 110. In another example, the search system 130 may visually display search results that correspond to web pages accessed by the expert in a prominent position in relation to other search results in a search result list. Including the search result in a more prominent position within a list or grouping of search results (e.g., at, or near, the top of the list) may be referred to as "boosting" the search result. In yet another example, the search system 130 may re-rank or re-group the search results based on a comparison of the search authority model and a model created for the document (e.g., web page) to which each search result corresponds (e.g., search result models).

Figure 2:
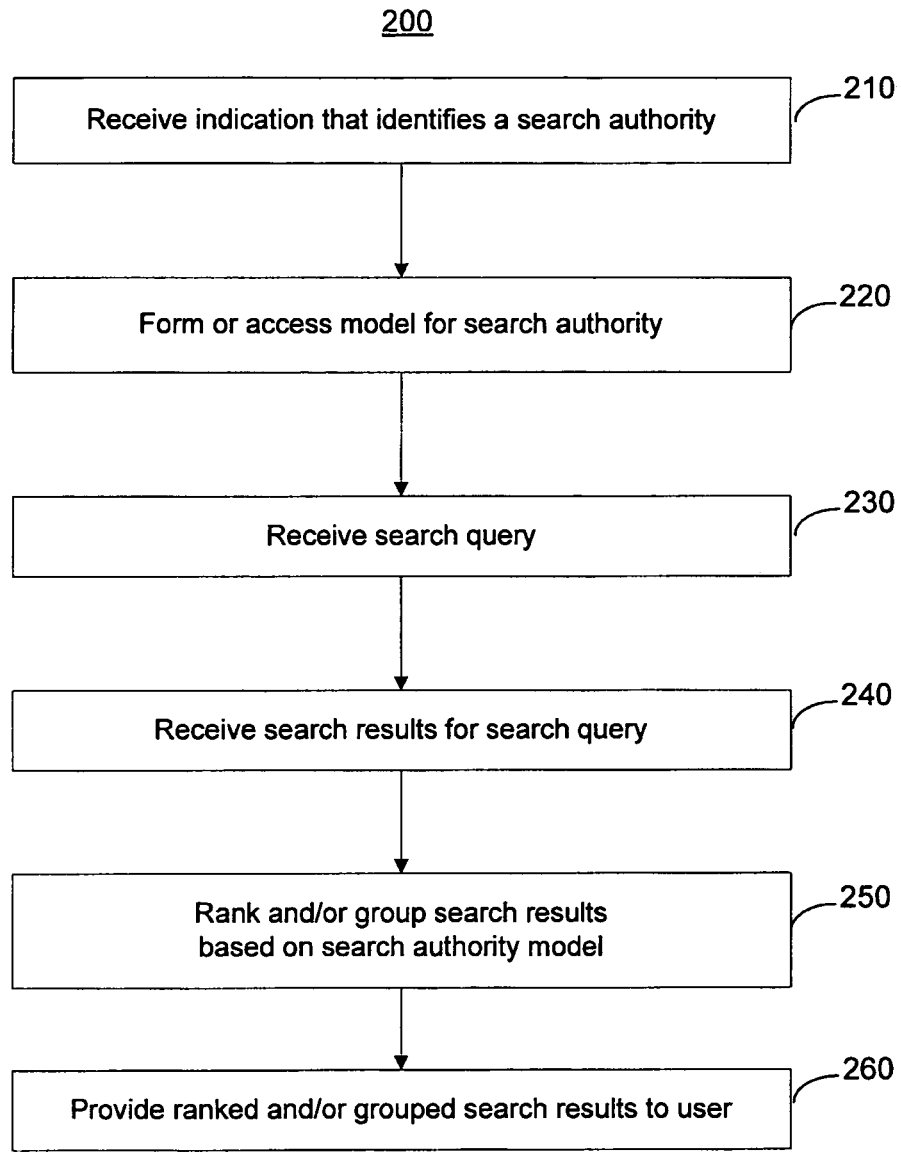
FIG. 2 is a flow chart of an exemplary process for providing search results that are ranked based on a search authority.

Process 200 of FIG. 2 is configured to provide search results that are ranked based on a search authority. For convenience, particular components described with respect to FIG. 1 are referenced as performing the process 200. However, similar methodologies may be applied in other implementations where different components are used to define the structure of the system, or where the functionality is distributed differently among the components shown by FIG. 1.

The search system 130 receives an indication that identifies a search authority (210). The indication that identifies the search authority may be a selection by the searching user of a particular expert. The searching user may make the selection from, for example, a list of search authorities. Alternatively, the indication that identifies the search authority may be an automatic identification of a search authority by the search system 130. For example, the search system 130 may access a list of search authorities organized by topic. In some implementations, when a searching user enters a search query, the search system 130 may identify a category to which the search query is related (e.g., by accessing an ontology or taxonomy and matching words within the search query to a category). The search system 130 may access the list of search authorities and select a particular search authority that is listed as an expert in the category identified for the search query. The selected search authority may be the search authority automatically identified by the search system 130. Alternatively, or additionally, the search system 130 may automatically identify a search authority for a searching user, based on categories associated with past searches performed by the authority user or recent web pages the authority user browsed. In this implementation, the search system 130 may determine a category associated with the past searches or recent web browsing and select a search authority based on the category.

The search system 130 forms, or accesses, a search authority model (220). In some implementations, the search authority model may represent a search authority feature vector. A feature vector is an n-dimensional vector (or array) of features, or data, extracted from raw data for further processing. The data included in the search authority feature vector may relate to information included in an expert's interest profile and/or other information corresponding to the expert's expertise in the particular topic, as described in more detail below.

The search system 130 receives a search query from a searching user (230). A search query is a representation of a gap in a searching user's information space (e.g., an information need). For example, a searching user who is seeking information on a running watch that includes a global positioning system (GPS), may enter the query "GPS running watch."

The search system 130 receives search results that are responsive to the search query (240). In some implementations, the search system 130 may generate the search results by accessing a corpus (or collection) of documents and determining, based on metadata or the content within the documents, whether the documents include information that is responsive to the information need represented by the search query. For example, the search system 130 may determine that a web page that includes information related to configuring a GPS watch is responsive to the search query "GPS running watch," and thus, may provide the searching user with a search result associated with the web page. Additionally, or alternatively, the search results may be determined by another component or system, and provided, or made accessible, to the search system 130.

The search results received or generated by the search system 130 may be pre-ranked based on a standard ranking process that takes into account general popularity of the web pages that the search results represent, as well as the interests and information included in an interest profile associated with the searching user.

The search system 130 ranks (or re-ranks) or groups (or re-groups) the search results based on the search authority feature vector (250). For example, topics related to the search authority, and included in the search authority feature vector, may be deemed to be the "popular" topics for the particular search when using the particular search authority to inform the search. Thus, in this example, search results related to "popular" topics may be presented at a prominent position in (e.g., boosted to the top of) the search result list or otherwise visually distinguished from other search results. If the search results were pre-ranked, the search system 130 may re-rank the search results based on the search authority feature vector. In some implementations, the search system 130 may add (or remove) search results based on the search authority feature vector. For example, the search authority feature vector may include information indicating that a particular piece of content (e.g., a web page) is relevant to a topic being searched (or, is not relevant), even though search results corresponding to the web page are not included (or are included) in the search results received or generated by the search system 130.

The search system 130 provides the ranked search results to the searching user by, for example, enabling the searching user to perceive the search results in a visual display (260).

In some implementations, rather than using information included in a search authority feature vector to re-rank or re-group search results that have already been determined for a particular search query, the search system 130 may use information included in a search authority feature vector to adjust the search query prior to determining search results that are responsive thereto. Search results then may be determined by the search system 130 based on the adjusted search query.

Information included in a search authority feature vector 310, a document feature vector 320 and a query feature vector 330 is illustrated in FIG. 3. As noted above, a feature vector is an n-dimensional vector of features. More particularly, a feature vector is a representation of a particular collection of data, such as, for example, a user interest profile, a document or a search query. Each type of feature vector (e.g., search authority feature vector 310, document feature vector 320 and query feature vector 330) may include different features and each individual instance of a particular type of feature vector may include different values for the features of that type of feature vector.

The search authority feature vector 310 may include, for example, one or more of the following: a topic 311 on which the search authority has expertise (e.g., running), past search terms 312 (and any weights associated with the search terms) entered by the expert (e.g., "Army Ten Miler") and past search results 313 that were returned in response to the past search terms, past search results on which the expert clicked-through 314. A clicked-through search result may be a search result for which the expert selected a hyperlink or other reference and accessed the content item (e.g., web page) to which the search result, and associated hyperlink, referred. The search authority feature vector 310 also may include, for example, one or more of the following: web pages browsed by the expert 315 (e.g., "www.runners.com"), terms included in, or derived from, the web pages that the expert browsed 316 (e.g., "marathon," "pace," and "energy bars") and any information included in an interest profile provided by the expert 317 (e.g., links to favorite web pages, titles of books related to running and races completed).

A model, such as, for example, a feature vector, also may be created to represent a particular document, such as, for example, a web page, a text document, an email, a .pdf document, an image or even video or audio content. As also shown in FIG. 3, a document feature vector 320 may include, for example, information related to the content of the document (e.g., terms that appear in the content) and statistics and information about the document, itself (e.g., a publication date of the document). More precisely, the document feature vector 320 may include one or more of the following: various terms 321 and 322 that appear in the document (e.g., "marathon" and "pace"), a frequency 323 and 324 at which those terms appear in the document (e.g., 15 words and 20 words), a length of the document 325 (250 words), a source of the document 326 (e.g., web page from www.runners.com) and a publication date of the document 327 (e.g., Jun. 28, 2006).

Similarly, a model, such as, for example, a feature vector may be created for a search query provided by a searching user. As also shown in FIG. 3, a query feature vector 330 may include, for example, one or more of the following: terms that are included in the query 331 and 332 (e.g., "marathon" and "locations"), a length of the query 333 (e.g., 2 words), a date 334 on which the query was provided by the searching user (e.g., Jun. 30, 2006), an identity of the searching user who entered the query 335 (which may be represented by a screen name, a legal name, an IP address, an email address or some other identifier) and a reference to the feature vector 336 for the searching user, the expert or some combination thereof, that may be used to inform the search results provided for the query.

Figure 4:
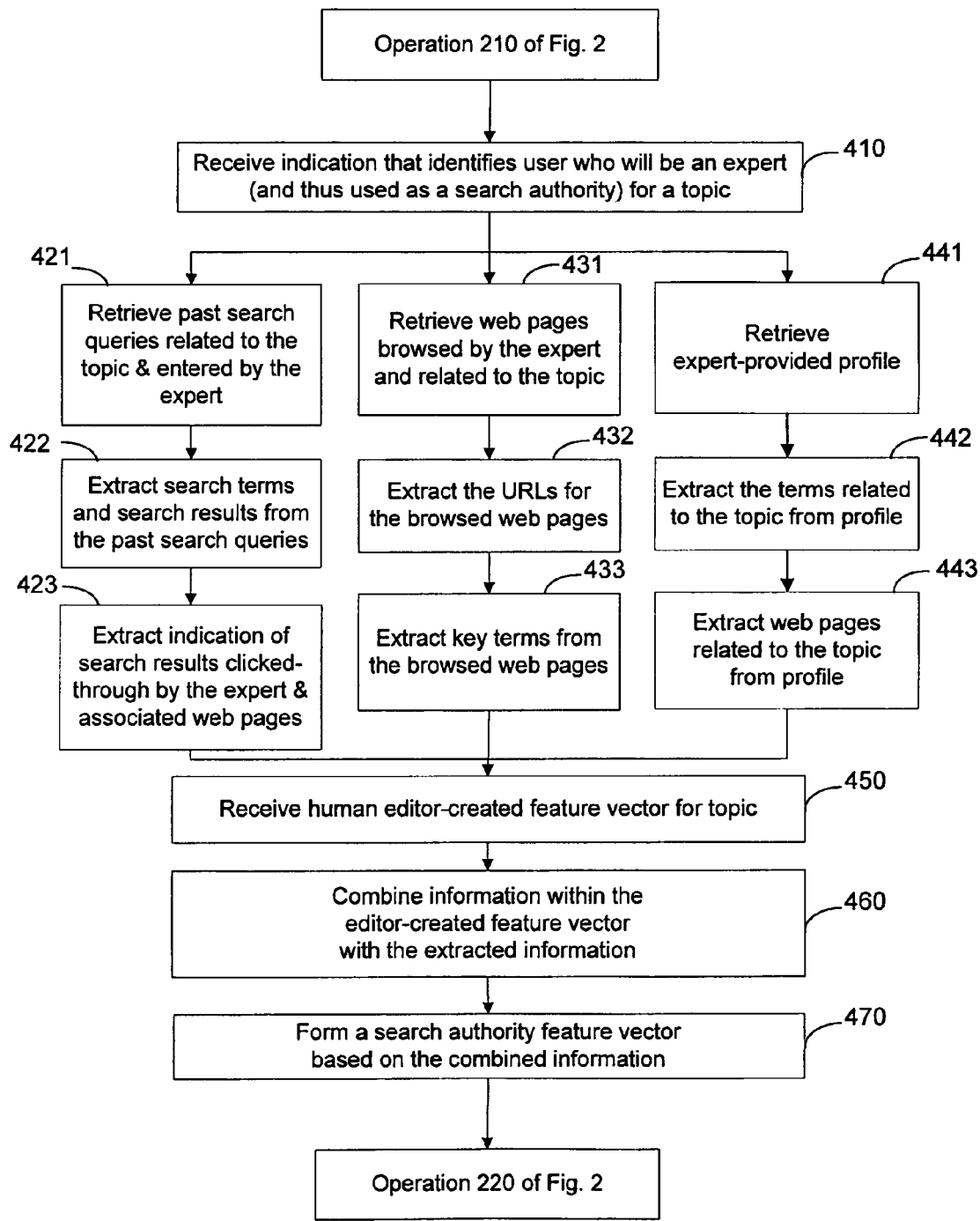
FIG. 4 is a flow chart of an exemplary process for creating a search authority feature vector based on a single user interest profile.

Process 400 of FIG. 4 is configured to create the search authority feature vector 310 of FIG. 3 based on a single user interest profile. For convenience, particular components described with respect to FIG. 1 are referenced as performing the process 400. However, similar methodologies may be applied in other implementations where different components are used to define the structure of the system, or where the functionality is distributed differently among the components shown by FIG. 1. The operations of process 400 may be performed between operations 210 and 220 of FIG. 2.

The search system 130 receives an indication that identifies an authority user to be used as a search authority for a topic (410). The search system 130 retrieves past search queries related to the topic and entered by the expert (421). For example, the topic may be exercise and past search queries entered by the expert may be determined to be related to the topic, for example, if the words included in the past queries are related to a category of "exercise" within a previously created ontology or taxonomy, if search results provided in response to the past queries were associated with documents that included terms and information related to exercise and if the expert's web browsing activity around the time when the expert entered the past query was related to exercise.

The search terms and search results are extracted from the past search queries (422). A search result may be, for example, a reference, a pointer or a link to an electronic content item provided in response to a search query and deemed to address the information need of a searching user represented by the search query. An electronic content item may include, for example, a web page, a text document, a spreadsheet, an image, video content, audio content or a .pdf document. In another implementation, a search result is a content item, rather than a reference, pointer or link to a content item.

The search system 130 extracts an indication of search results that were clicked-through by the expert and the web pages that correspond to the clicked-through search results (423). As mentioned previously, a search result may be "clicked-through" when the expert selected a hyperlink or other reference associated with a search result and accessed a content item (e.g., a web page) associated with the search result.

In one implementation, the search system 130 may extract a uniform resource locator (URL) associated with the web page that corresponds to a search result. The URL may be extracted from a particular web page when the search system 130 stores the URL that acts as an address for the particular web page. For example, the URL for a running web page that corresponds to a search result, may be www.runners.com, and thus, the search system 130 may extract "www.runners.com" from the web page Additionally, or alternatively, the search system 130 may access the corresponding web page (using the URL) and extract key words therefrom. To do so, the search system 130 may analyze the text included in, as well as metatags or metadata associated with, the web page to determine words or phrases that appear within the web page with a high frequency. The search system 130 may determine the high frequency words as being important or "key" to the overall content of the web page, and thus identify, and extract those "key words" from the web page.

In parallel with operations 421-423, the search system 130 retrieves web pages that are related to the topic and that the expert has previously browsed (431). The search system 130 also extracts the uniform resource locator (URL) for each of the retrieved web pages (432) and key terms from the browsed web pages (433), as described above.

Also in parallel with operations 421-423 and operations 431-433, the search system 130 retrieves an interest profile associated with, and explicitly provided by, the expert (441). The search system 130 also extracts terms related to the topic from the expert's interest profile (442) and any web pages related to the topic and listed in the interest profile (443). For example, to determine which terms and web pages in an expert's interest profile may be associated with the "running" category, the terms and web pages may be stored within the interest profile in a "running" location or may be tagged with a "running" ID.

Operations 421-423, 431-433 and 441-443 need not occur in parallel, but rather may occur in another temporal order (e.g., sequentially). Moreover, only a subset of the operations may be used to extract the information. For example, one or two groups of operations selected from the three groups 421-423, 431-433 and 441-443 may be used to extract the information. For a given topic, a human editor may create a model, such as, for example, a feature vector that represents information related to that topic. The editor-created feature vector may include key words or phrases associated with the topic, web pages associated with the topic and possibly even a list of authority users that are known to be experts on the topic. If an editor-created feature vector exists for the particular topic for which the search authority feature vector is being created, the search system 130 may retrieve the editor-created feature vector (450). The features extracted from the expert may be combined with the features of the retrieved editor-created feature vector (460). For example, the raw data to be used in creation of a feature vector for the search authority, may include features, such as, for example, terms and web page URLs, from within both the editor-created feature vector and the expert's interest profile. The search system 130 forms a search authority feature vector having features that include the combined information (470). If an editor-created feature vector does not exist, the search system 130 may form the search authority feature vector using only the features extracted by operations 421-423, 431-433 and/or 441-443.

As such, a search authority feature vector may be formed based on information included in an expert's interest profile, which may include information explicitly provided by the expert for the purpose of creation and/or updating of the interest profile or for some other purpose (e.g., for initialization of Internet services, online shopping or completing a survey), as well as information associated with the user's online experience (e.g., past web browsing and searching behavior), which is automatically determined and collected by the search system 130 or some other system.

Figure 5:
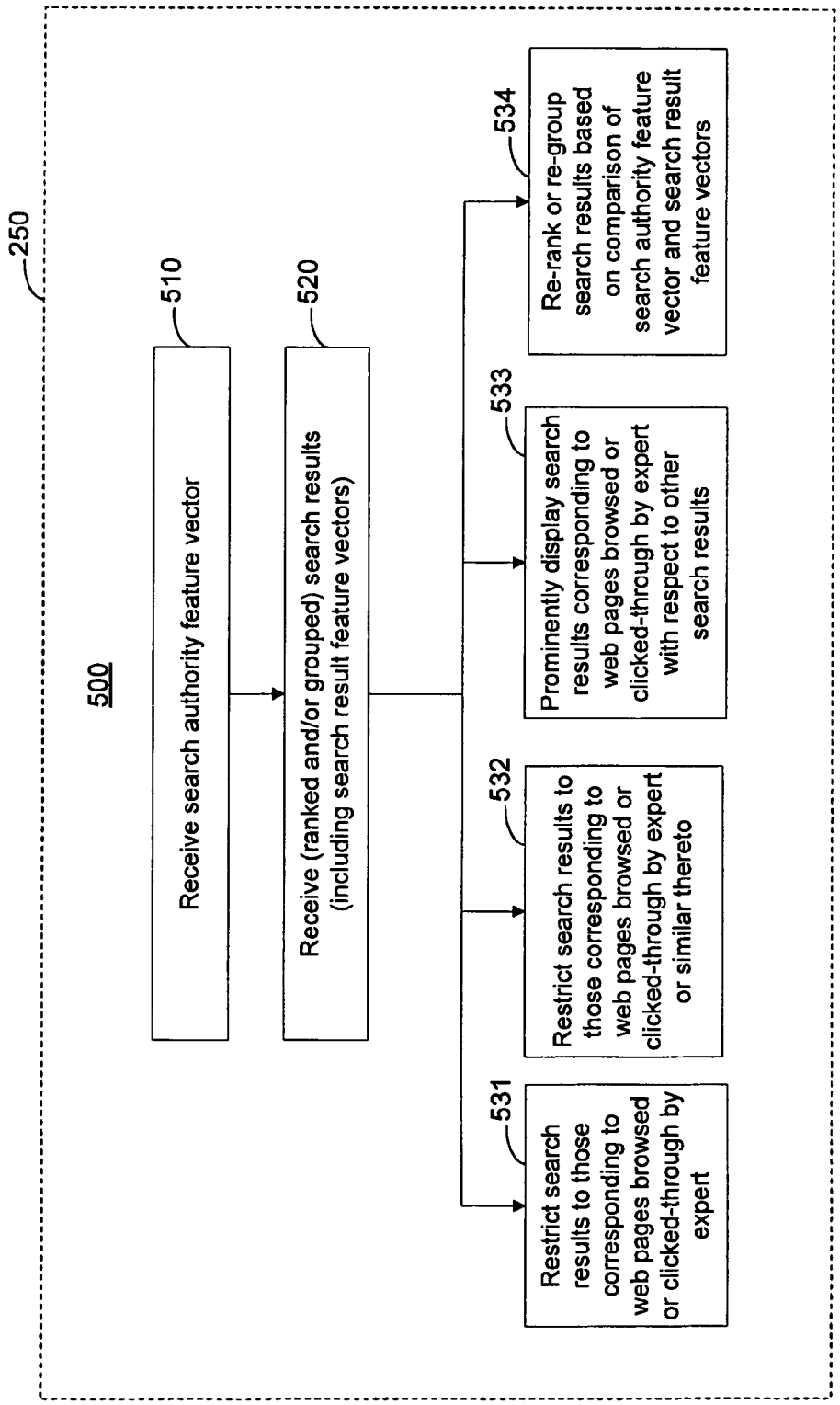
FIG. 5 is a flow chart of an exemplary process for using a search authority feature vector to inform search results.

Process 500 of FIG. 5 is configured to use a search authority feature vector to inform search results. For convenience, particular components described with respect to FIG. 1 are referenced as performing the process 500. However, similar methodologies may be applied in other implementations where different components are used to define the structure of the system, or where the functionality is distributed differently among the components shown by FIG. 1. The operations of process 500 are an exemplary implementation of operation 250 of FIG. 2.

The search system 130 receives a search authority feature vector (510). The search system 130 then receives search results, which have been previously determined for a particular search query, and feature vectors associated with each of the documents represented by the search results (520). The previously determined search results may have been generated by search system 130, as described above, in response to a particular search query entered by a searching user. The search results are previously determined because the search results may have been generated prior to the search system 130 receiving a search authority feature vector and/or feature vectors associated with the documents represented by the search results. The received search results may be pre-ranked and/or pre-grouped according to a standard ranking and/or grouping process.

In some implementations, the search system 130 may receive a search authority feature vector if the expert for whom the search authority feature vector has been formed is an expert in a topic that is related to the search query for which the previously determined search results were provided. As described above, the expert may have been selected by the searching user or automatically by search system 130. In one example, the search query may include the phrase "running sneakers." The searching user who provided the search query may have requested that an interest profile associated with expert A be used to influence search results provided in response to the "running sneakers" search query. Alternatively, the search system 130 may determine that the search query "running sneakers" is related to exercise, and that expert B is an expert in exercise, and thus, search system 130 automatically determined that an interest profile associated with expert B would be used to influence the search results for the "running sneakers" search query.

In either case, the search system 130 may receive a search authority feature vector associated with the search authority (e.g., expert A or expert B) that will be used to influence search results provided to the searching user in response to the search query. In process 500, after the search system 130 has received the search authority feature vector, the search system 130 then receives or generates search results related to the "running sneakers" search query. Thus, the search results received or generated by search system 130 in operation 520 have not yet been influenced by the search authority feature vector.

The search system 130 then may perform one or more of operations 531-534. The search system 130 may restrict search results to those that correspond to web pages that were previously accessed (e.g., browsed or clicked-through) by the expert (531). The search system 130 may restrict search results to those corresponding to web pages that were previously accessed by the expert, and search results that correspond to web pages that are similar thereto (532). The search system 130 may prominently display (e.g., boost) search results that correspond to web pages accessed by the expert with respect to other search results in a search result list (533). The search system 130 may re-rank or re-group the search results based on a comparison of the search authority feature vector and feature vectors created for each of the documents to which the search results correspond (i.e., the search result feature vectors) (534). The closer the feature vectors (e.g., the smaller the distance or cosine of an angle between a particular search result feature vector and the search authority feature vector), the higher (or lower, depending on the implementation) the rank that may be associated with the search result.

In some implementations, and as mentioned above, to generate search results that are informed by an expert's interest profile, information included in a search authority feature vector may be used by the search system 130 to adjust a search query prior to determining search results that are responsive to the search query. For example, the search system 130 receives a search query from a searching user of "running sneakers." A search authority feature vector associated with an expert (e.g., expert A or expert B in the above example) is accessed by the search system 130. The accessed search authority feature vector includes information related to running, such as, for example, the words "pronate" and "supinate," which refer to foot characteristics that should be taken into account when purchasing running sneakers. The search system 130 adjusts the search query "running sneakers" to include information from within the accessed search authority feature vector, such that an adjusted search query "running sneakers AND pronate AND supinate" is generated. The search system 130 then uses the adjusted search query to determine search results that are responsive to both the searching user's original search query "running sneakers" and information included within the interest profile (as represented by the search authority feature vector) of an expert selected by, or for, the searching user.

Figure 6:
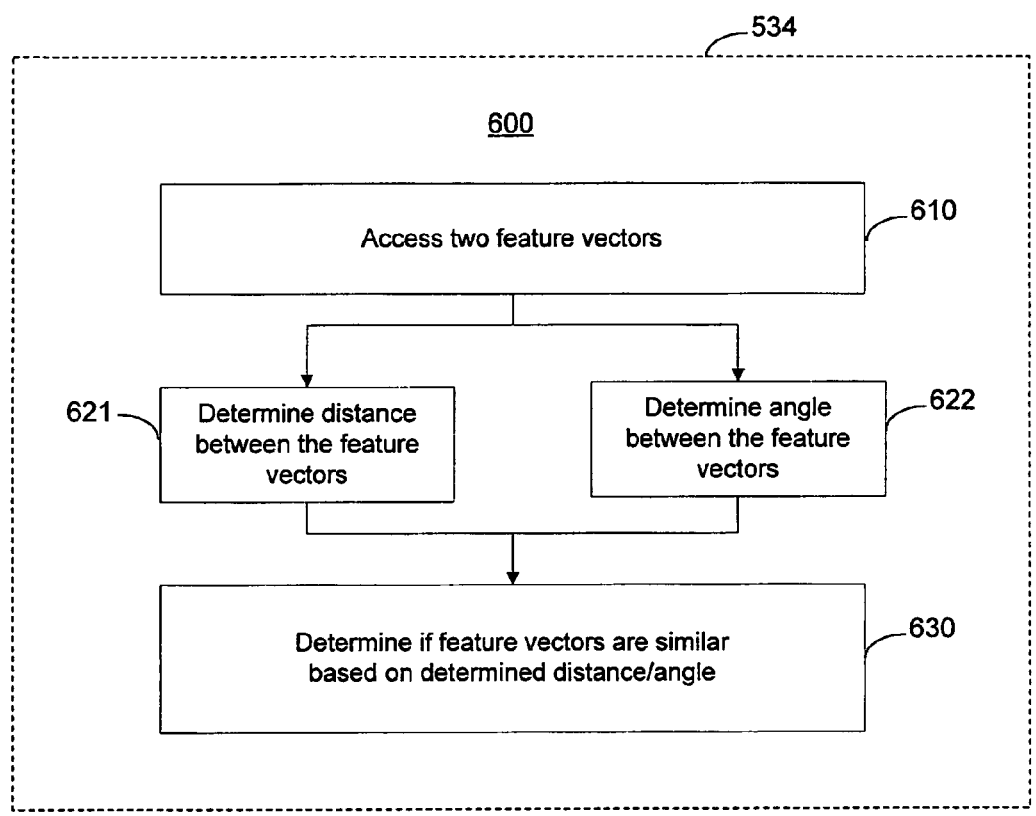
FIG. 6 is a flow chart of an exemplary process for comparing two feature vectors.

Process 600 of FIG. 6 is configured to compare two feature vectors. For convenience, particular components described with respect to FIG. 1 are referenced as performing the process 600. However, similar methodologies may be applied in other implementations where different components are used to define the structure of the system, or where the functionality is distributed differently among the components shown by FIG. 1. The operations of process 600 are an exemplary implementation of a feature vector comparison as contemplated by operation 534 of FIG. 5. Feature vectors may be compared to determine a degree of similarity between data represented by the feature vectors.

The search system 130 accesses two feature vectors, such as, for example, a search result feature vector and a search authority feature vector (610). The search system 130 may compare the two feature vectors using one of two methods to determine a degree to which the two feature vectors are similar. Feature vectors can be represented as points in N-dimensional space. To do so, the "values" of the fields for a feature vector may be referred to by a number, and the list of numbers within the vector can be considered coordinates. In a simple example, a feature vector that includes two fields (or pieces of data) may be represented by the coordinates (1,1) if the values in the two fields can each be represented by the number 1. Because the feature vectors can be represented as points in 2-dimensional space, a mathematical relationship between the feature vectors may be identified to determine a degree of similarity between two or more feature vectors.

The first method includes determining a distance between the two feature vectors (621). The distance may be, for example, a Euclidean distance. The second method includes determining the cosine of an angle between the two feature vectors (622). The search system 130 then determines if the two feature vectors are similar based on the determined distance or angle (630). A small distance or angle cosine between two feature vectors may correspond to a large amount of similarity between the data represented by the feature vectors. As noted above, and in one example, if a feature vector for a document that corresponds to a search result is very similar to a search authority feature vector, the search result may be boosted to the top of the search result list, or otherwise displayed prominently with respect to other search results.

Figure 7:
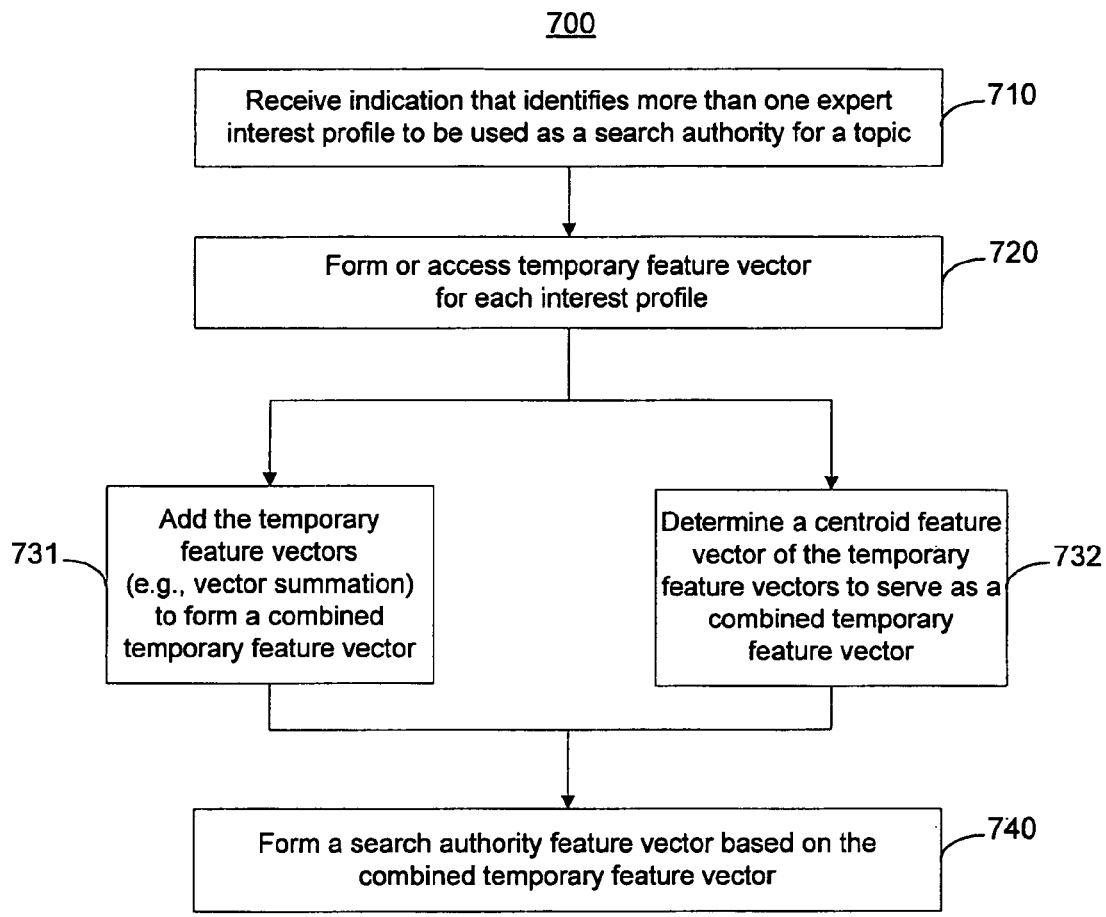
FIG. 7 is a flow chart of an exemplary process for creating a search authority feature vector based on more than one user interest profile.

Process 700 of FIG. 7 is configured to create the search authority feature vector 310 of FIG. 3 based on more than one user interest profile. For convenience, particular components described with respect to FIG. 1 are referenced as performing the process 700. However, similar methodologies may be applied in other implementations where different components are used to define the structure of the system, or where the functionality is distributed differently among the components shown by FIG. 1. The search system 130 receives an indication that identifies more than one interest profile to be used as a search authority for a topic (710). Each of the more than one interest profiles is typically, but need not be, an interest profile of a different user. The indication may be received in response to a searching user selecting (or the search system 130 determining) an expert whose interest profile may inform search results for a query provided by the searching user, or in response to the searching user requesting that a combination of the searching user's interest profile and an expert's interest profile be used to inform the search results. In some implementations, more than two interest profiles may be combined into a single search authority feature vector. The searching user may indicate that a combination of interest profiles are to be used as a search authority for a topic by selecting more than one search authority, as described in more detail below with respect to FIGS. 8, 9 and 10.

The search system 130 forms temporary feature vectors for each interest profile (720). The search system 130 may combine the two or more temporary feature vectors by adding the temporary feature vectors (e.g., performing a vector summation) to form a combined temporary feature vector (731) or determining a centroid for the temporary feature vectors to be used as a combined temporary feature vector (732). A centroid for the temporary feature vectors may be determined using a clustering technique or by determining a weighted average of all of the temporary feature vectors.

The search system 130 forms a search authority feature vector based on the combined temporary feature vector (740). In some implementations, the search authority feature vector simply may be the combined temporary feature vector determined in one of operations 731-732, as described above. Alternatively, the search authority feature vector may include information from within the combined temporary feature vector, as well as additional information, such as, for example, an indication of a number of experts whose interest profiles were used to create the temporary feature vectors, as well as identifiers corresponding to those experts.

Figure 8:
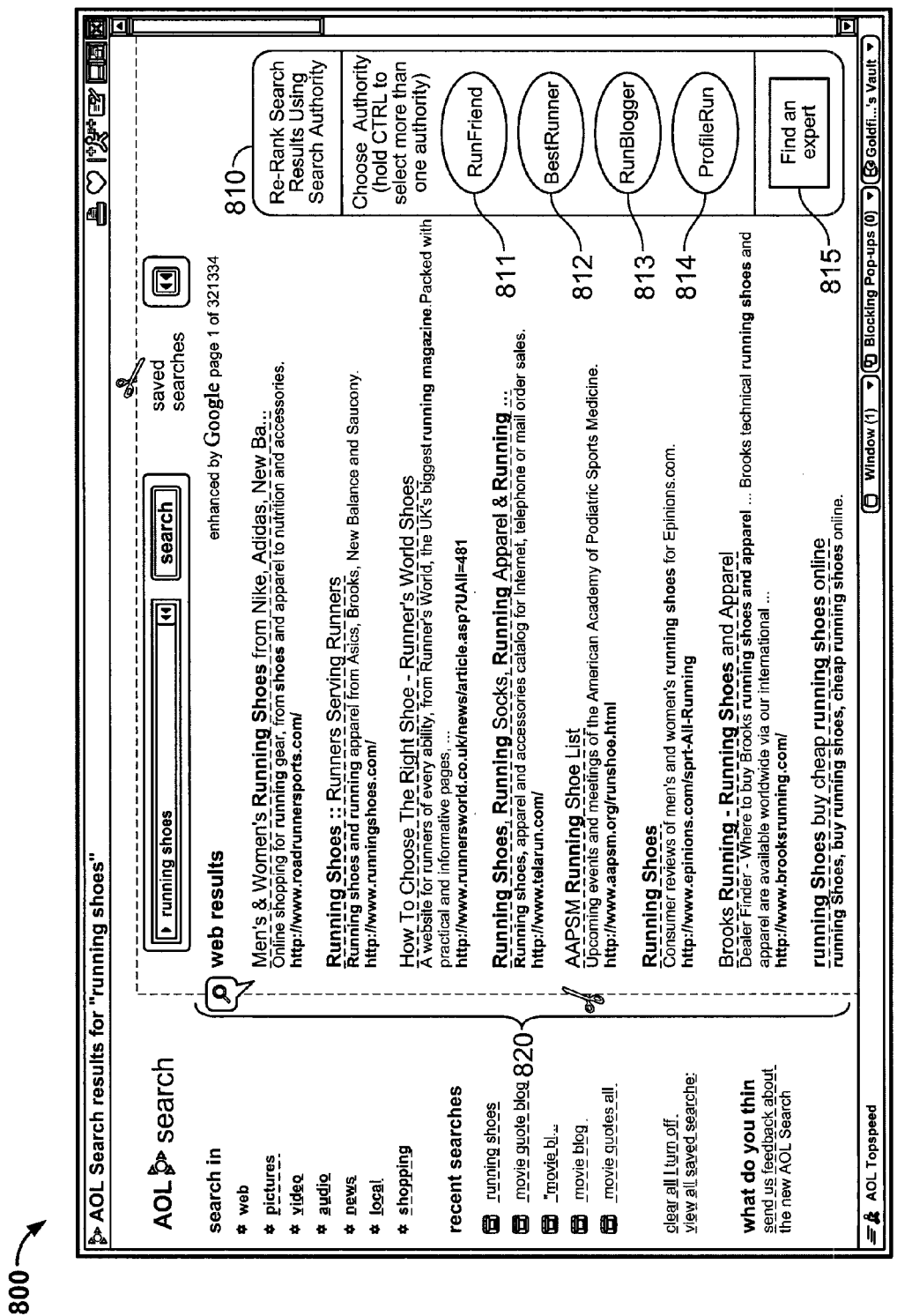
FIG. 8 is an illustration of a graphical user interface (GUI) that is configured and arranged to enable a searching user to rank (or re-rank) search results using a search authority.

GUI 800 of FIG. 8 is configured and arranged to enable a searching user to rank (or re-rank) search results using a search authority. GUI 800 includes search results 820 provided to a searching user in response to the search query "running shoes." In some implementations, the search results 820 shown have been pre-ranked according to a standard ranking process. Alternatively, the search results 820 may be presented to the searching user in an order unrelated to a ranking. The GUI 800 includes toolbar 810 that allows the searching user to rank (or re-rank) the search results 820 using a search authority. The searching user may do so by selecting a button within toolbar 810 that represents one or more search authorities who have expertise in a topic related to the searching user's query "running shoes," such as, for example, the search authority identified as "RunFriend." Toolbar 810 may be populated by the search system 130 with search authorities that have an expertise in a topic related to a current search query. For example, and as described above, the search system 130 may determine that a search query (e.g., "running shoes") is related to a particular topic (e.g., "running") based on an ontology or taxonomy. The search system 130 then may identify search authorities that are experts in the determined topic (e.g., "running") by accessing a list of search authorities organized by expertise topics. The search system 130 thus may cause to be displayed a button within toolbar 810 for each of the identified search authorities.

The toolbar 810 includes buttons 811-814 for experts that may have been identified as a search authority (and thus, associated with a topic, and included in the search authority list accessible by the search system 130) in various ways. For example, the expert referred to as RunFriend in button 811 may be an authority user who is known to the searching user and who the searching user explicitly selected to be an expert on a particular topic, such as, for example, running. The expert referred to as BestRunner in button 812 may be an authority user who has been voted by others as an expert in the topic of running. The expert referred to as RunBlogger in button 813 may be an authority user who authors a blog about running, and thus, has been identified as an expert on the topic due to that electronic presence. The expert referred to as ProfileRun in button 814 may be an authority user who has been determined to be an expert on running based on information included in an interest profile provided by the expert. The tool bar 810 may optionally display the topic (or topics) that the search system 130 determined as being related to the search query.

Instead of selecting one of the provided search authorities, toolbar 810 is also configured to allow a searching user to search for an expert by selecting button 815. For example, a searching user may select button 815 to initiate a search for a search authority that has expertise in a topic associated with the search query. Upon selection by a searching user of button 815, search system 130 may identify all topics associated with the current search query and identify search authorities that are associated with the identified topics. The search authorities then may be presented by search system 130 to the searching user (not shown) and the searching user may select one or more of the search authorities. In another example, selection of button 815 may cause one of GUI 900 or GUI 1000, as described below with respect to FIGS. 9 and 10, to be displayed in order for the searching user to select a search authority.

In some implementations, a search query entered by a searching user may be associated with more than one topic. For example, the search query "Eagles" may be related to a bird category, a football category or a music category. In this scenario, a GUI, such as, for example, GUI 800, may include a single toolbar that includes buttons related to search authorities who are experts in each of the topics associated with the search query. Alternatively, GUI 800 may include multiple toolbars, each having buttons that are associated with search authorities who have an expertise in one of the associated topics.

Upon selection of button 815 of FIG. 8, in some implementations, the search system 130 may determine if the searching user wishes to select a search authority known based on people who are known to the searching user or based on various searching user-selected criteria. If so, the search system may present the searching user with GUI 900 of FIG. 9. Alternatively, the search system 130 may determine that the searching user wishes the search system to choose one or more search authorities from among the selected search authorities. If so, the search system may present the searching user with GUI 1000 of FIG. 10.

Figure 9:
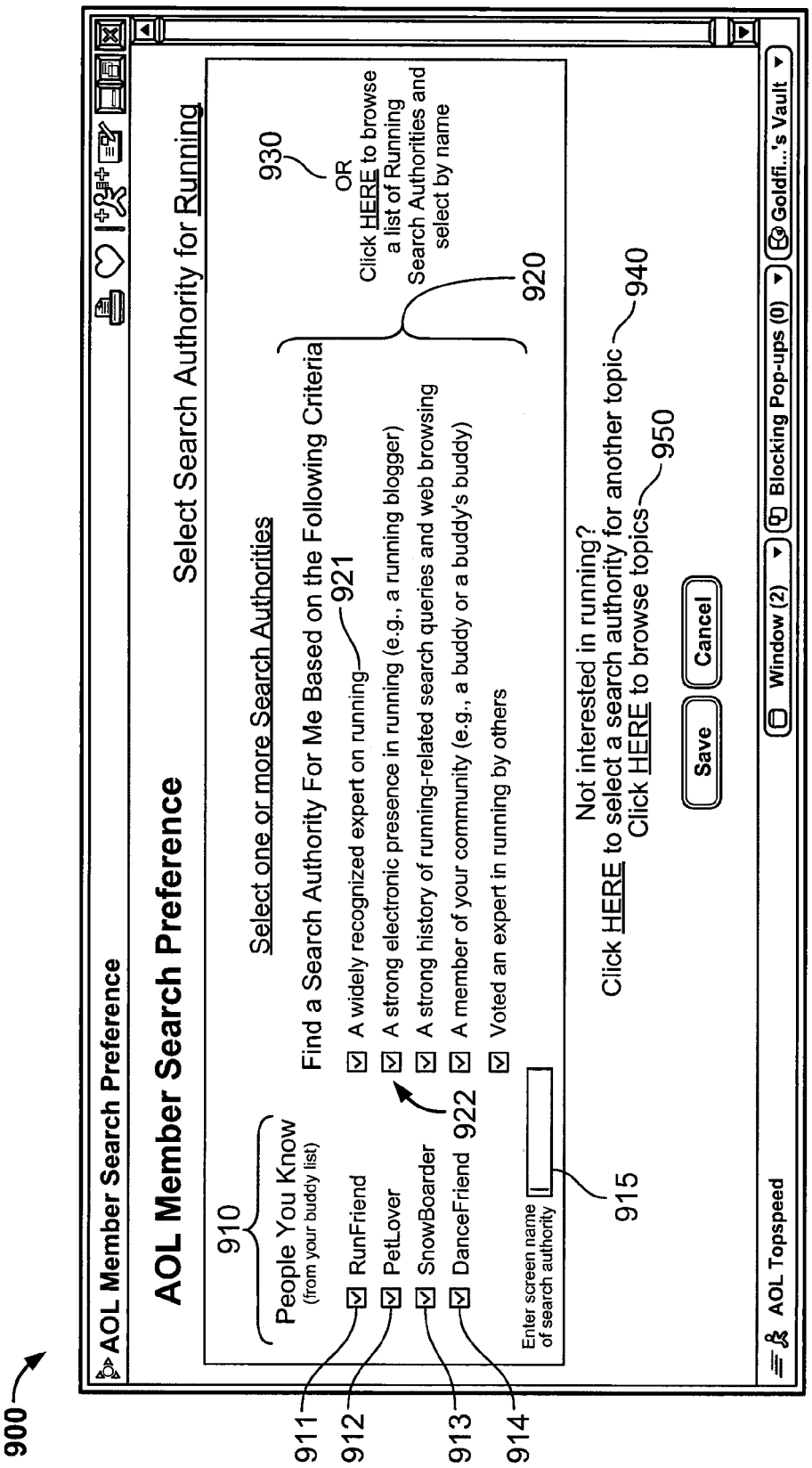
FIG. 9 is an illustration of a GUI that is configured and arranged to enable a searching user to select a search authority for a particular topic.

GUI 900 of FIG. 9 is configured and arranged to enable a searching user to select a search authority for a particular topic. More particularly, GUI 900 may allow a searching user to select one or more authority users to act as a search authority for the topic "running." Once an expert is selected as a search authority by the searching user on one occasion, an identifier related to the search authority may be indicated in other user interfaces presented to the searching user, such as, for example, GUI 800 of FIG. 8.

GUI 900 includes a section 910 configured to enable a searching user to select one or more people known to the searching user (e.g., RunFriend 911, PetLover 912, SnowBoarder 913 and DanceFriend 914) as a search authority for the topic "running." The people known to the searching user are selected from a contact or co-user list (e.g., a buddy list) associated with the searching user. GUI 900 is also configured to enable a searching user to provide the name of a person known to the searching user as a search authority in text entry box 915. For example, the searching user may provide the name "BestRunner," which is a screen name associated with a friend of the searching user's or someone the searching user read about as having expertise in the topic of running, in text entry box 915 to select the authority user BestRunner as a search authority for the topic of "running." GUI 900 also includes a section 920 configured to enable a searching user to provide criteria (e.g., "a widely recognized expert on running" 912 or "a strong electronic presence in running" 922) for use by the search system 130 to find a search authority for the searching user. GUI 900 also includes a hyperlink 930 that, when activated by a searching user, enables the searching user to browse a list of search authorities for the topic "running" by expert name or identifier. The searching user may select a search authority for another topic by selecting the hyperlinks 940 and 950 at the bottom of GUI 900 to select another topic (hyperlink 940) or browse topics (hyperlink 950).

Figure 10:
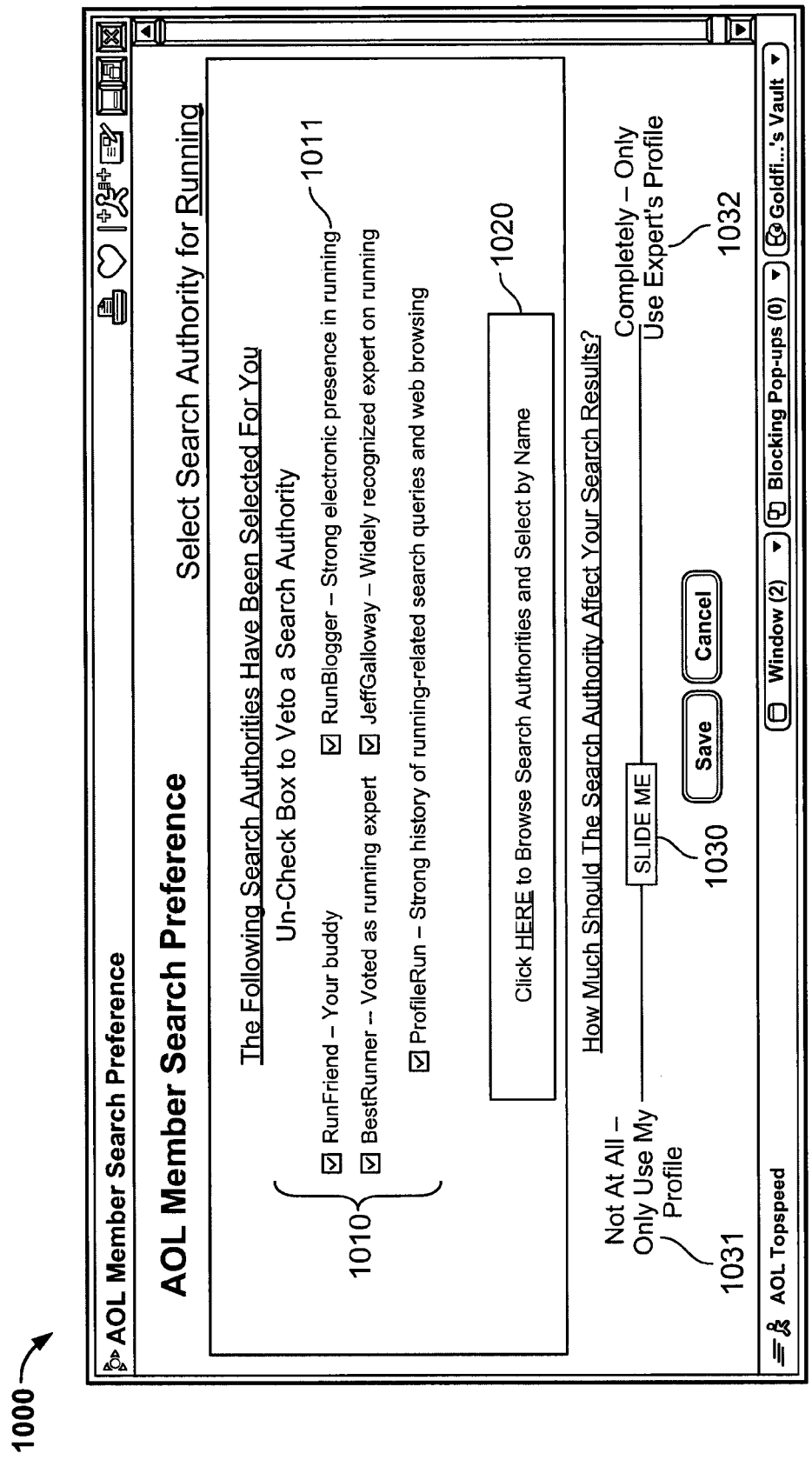
FIG. 10 is an illustration of a GUI that is configured and arranged to provide search authorities that have been identified for a searching user.

GUI 1000 of FIG. 10 is configured and arranged to provide search authorities that have been identified by a search system 130 for a searching user. For example, the search authorities provided by GUI 1000 may have been identified for the searching user based on criteria provided by the searching user via a user interface, such as, for example, GUI 900 of FIG. 9. The search authorities provided by GUI 1000 are for the topic of "running."

GUI 1000 includes a list of identifiers 1010 related to several search authorities and also indicates a reason for selecting the identified authority users as searching authorities. For example, the authority user RunBlogger 1011 has been determined to be a search authority because of the authority user's strong electronic presence on the topic of running. The searching user may select none, some or all of the identified authority users as search authorities by checking or un-checking the boxes associated with each of the identifiers 1010. GUI 1000 also enables a searching user to activate a hyperlink 1020 in order to browse search authorities for the topic running and select one or more experts by name.

GUI 1000 is also configured to enable a searching user to determine how much the expert interest profile (and thus, the search authority feature vector) associated with the one or more selected experts should affect the search results. If a searching user selected more than one search authority in GUI 900 of FIG. 9, an interface similar to that shown at the bottom of FIG. 10 also may be provided in association with GUI 900.

The searching user may determine how much the expert interest profile associated with the one or more selected experts should affect the search results by moving a slider 1030 between the extremes of only using an interest profile of the searching user to inform the search results 1031 and only using the expert's interest profile (and thus, the search authority feature vector for the expert) to inform the search results 1032. An intermediate slider position may result in creation of a combined search authority feature vector that includes attributes from both the expert's interest profile and the searching user's interest profile. As described above with respect to FIG. 7, the combined feature vector may be a based on vector summation of the various search authority feature vectors to be combined or may be a centroid of the search authority feature vectors to be combined. In the centroid implementation, the position of the slider 1030 may determine appropriate weights to be applied to a searching user feature vector (e.g., a feature vector that represents the data within an interest profile associated with the searching user) and to a search authority feature vector prior to combining (e.g., averaging) the feature vectors to form the centroid feature vector.

Although this application focuses on using vector-based techniques to determine search results that take into account interest profile and other information associated with a searching user and/or an expert, probabilistic techniques also may be used to achieve the same result. For example, and in some implementations, rather than using a feature vector to represent a search authority model, a document model, and/or a query model, a simple collection of words, and associated weights, may be used as the various models.

The collection of words for a search authority model, for example, may include words included in an expert's interest profile, words associated with past search queries entered by the expert, words associated with past search results provided to the expert, and words associated with past clicked-through search results associated with the expert. The words included in the collection also may be associated with various weights that indicate which words are more important or significant than the other words included in the collection. For example, words associated with an expert's interest profile may be weighted, while words associated with past search results provided to an expert may not be weighted, in order to indicate that the words associated with the interest profile may be more helpful in determining search results for a new search query provided by a searching user for, or by, whom the expert has been selected the expert as a search authority.

As such, probabilistic measures, such as, for example, language models, may be used to determine proximity between a search authority model and a query model or a document model to provide a user with search results that are informed and influenced by information associated with an expert. For example, the greater the probability that terms included within a search authority model are included within a particular document, the more proximate to the search authority model the document may be deemed. The probability that the particular document includes a term may be determined based on, for example, how often the term appears in the particular document in relation to how often the term appears in a collection (i.e., corpus) of documents to which the particular document belongs, as a whole. In another example, the probability that the particular document includes a term may be determined based on, for example, whether a query that includes the term is likely to be generated from the particular document based on existence, and distribution of, terms included in the particular document.

More particularly, and notwithstanding how proximity is determined, search results may be identified for a particular query and probabilistic measures may be used to determine proximity of the documents referred to by the identified search results to the search authority model. Search results corresponding to documents that are more proximate to the search authority model may be boosted to the top of a search result list, while those search results corresponding to documents that are less proximate to the search authority model may be moved down in the list result list.

Probabilistic measures also may be used to select a search authority model for a searching user based on a particular query. As described above, an expert may be selected for a searching user based on a determination of an expert that has expertise in a topic related to a particular query entered by the searching user. Probabilistic measures may be used to identify such an expert. For example, proximity between more than one search authority model and a particular query may be determined in order to select an appropriate search authority model to be used in influencing search results provided for the particular query. A search authority model (or more than one search authority models) that is the most proximate to the particular query may be identified, and selected, as the search authority model to be used for the particular query.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made.

What is claimed is:

1. A method for generating search results, the method comprising:

receiving an indication that identifies a first user as an authority on a topic;

receiving a search query from a second user different from the first user, the search query including one or more search terms entered by the second user;

determining that the topic corresponds to the one or more search terms;

based on the determined topic, identifying the first user as a search authority for the search query;

accessing an interest profile of the first user;

accessing an interest profile of the second user;

forming a combined interest profile by performing a weighted combination of the interest profile of the first user and the interest profile of the second user, the forming comprising:

identifying a first and second weightings specified by the second user, the first weighting to be applied to the interest profile of the first user, and the second weighting to be applied to the interest profile of the second user; and performing the weighted combination in accordance with the identified first and second weightings;

determining, by a processing device, search results in response to the search query based on the combined interest profile; and enabling the second user to perceive the determined search results.

2. The method of claim 1 wherein receiving the search query comprises receiving a search query including one or more terms entered by the second user into an input field displayed in a graphical user interface.

3. The method of claim 1 wherein identifying the first user as a search authority for the search query comprises enabling presentation of a group of user identifiers to the second user in a graphical user interface, the user identifiers corresponding to users designated as search authorities for the topic; and enabling the second user to select an identifier corresponding to the first user from the group of user identifiers to identify the first user as the search authority for the search query.

4. The method of claim 1 further comprising enabling the second user to specify a first weighting to be applied to the interest profile of the first user and a second weighting to be applied to the interest profile of the second user when performing the weighted combination to form the combined interest profile.

5. The method of claim 4 wherein enabling the second user to specify a first weighting to be applied to the interest profile of the first user and a second weighting to be applied to the interest profile of the second user comprises enabling the second user to manually select the first weighting and the second weighting through interaction with a graphical user interface.

6. The method of claim 5, wherein enabling the second user to manually select the first weighting and the second weighting through interaction with the graphical user interface comprises enabling the second user to perceive, within the graphical user interface, a bar having a slider configured to be moved along the bar in response to user manipulation, and wherein the slider being moved to a first position on the bar that is located between a first and a second terminal end of the bar corresponds to selecting the first weighting and the second weighting.

7. The method of claim 5, wherein enabling the second user to manually select the first weighting and the second weighting through interaction with a graphical user interface comprises enabling the second user to perceive, within the graphical user interface, a bar having a slider configured to be moved along the bar in response to user manipulation, wherein the slider being moved to a first position on the bar that is located between a first and a second terminal end of the bar corresponds to selecting the first weighting and the second weighting for combining the interest profile of the first user and the interest profile of the second user;

wherein the slider being moved to the first terminal end of the bar corresponds to selecting weightings such that the interest profile of the second user is used to inform search results and the interest profile of the first user is not used to inform search results, and wherein the slider being moved to the second terminal end of the bar corresponds to selecting weightings such that the interest profile of the first user is used to inform search results and the interest profile of the second user is not used to inform search results.

8. The method of claim 1, wherein accessing the interest profile of the first user comprises accessing a feature vector for the first user, the feature vector being represented as a set of numerical values that includes numerical values representing interest information of the second user;

wherein accessing the interest profile of the second user comprises accessing a feature vector for the second user, the feature vector for the second user being represented as a set of numerical values that includes numerical values representing interest information of the second user; and wherein forming a combined interest profile comprises combining the feature vector of the first user with the feature vector of the second user to form a combined feature vector.

9. The method of claim 8, wherein the combined feature vector is a centroid feature vector formed by performing a weighted average of the feature vector of the first user and the feature vector of the second user.

10. The method of claim 8, wherein determining the search results in response to the search query comprises:

forming a query feature vector for the search query, the query feature vector being represented as a set of numerical values that include numerical values representing the terms submitted in the search query;

accessing document feature vectors, each of the document feature vectors corresponding to a document and being represented as a set of numerical values;

comparing the query feature vector with the document feature vectors by calculating distances or angles between the query feature vector and the document feature vectors;

identifying search result documents based on results of the comparison of the query feature vector with the document feature vectors;

comparing the combined feature vector with document feature vectors of the search result documents by calculating distances or angles between the combined feature vector and the document feature vectors of the search result documents; and determining the search results based on results of the comparison of the document feature vectors of the search result documents and the combined feature vector.

11. The method of claim 1, wherein determining the search results in response to the search query based on the combined interest profile includes identifying preliminary search results as responsive to the search query and modifying the preliminary search results based on the combined interest profile.

12. The method of claim 11, wherein modifying the preliminary search results based on the combined interest profile includes reranking the preliminary search results based on the combined interest profile.

13. The method of claim 11, wherein modifying the preliminary search results based on the combined interest profile includes regrouping the preliminary search results based on the combined interest profile.

14. A system comprising:

a processor; and a tangible non-transitory computer readable medium, storing a computer program product for generating search results, the computer program product including instructions that, when executed by the processor, cause the processor to:

receive an indication that identifies a first user as an authority on a topic;

receive a search query from a second user different from the first user, the search query including one or more search terms entered by the second user;

determine that the topic corresponds to the one or more search terms;

based on the determined topic, identify the first user as a search authority for the search query;

access an interest profile of the first user;

access an interest profile of the second user;

forming a combined interest profile by performing a weighted combination of the interest profile of the first user and the interest profile of the second user, the forming comprising:

identifying a first and second weightings specified by the second user, the first weighting to be applied to the interest profile of the first user, and the second weighting to be applied to the interest profile of the second user; and performing the weighted combination in accordance with the identified first and second weightings;

determine search results in response to the search query based on the combined interest profile; and enabling the second user to perceive the determined search results.

15. A method for generating search results, the method comprising:

receiving a search query from a query submitting user, the search query including one or more search terms entered by the query submitting user;

determining a topic corresponding to the one or more search terms;

based on the determined topic, identifying a search authority for the search query;

accessing an interest profile associated with the search authority;

accessing an interest profile of the query submitting user;

forming a combined interest profile by performing a weighted combination of aspects of the interest profile of the query submitting user and aspects of the interest profile associated with the search authority, the forming comprising:

identifying a first and second weightings specified by the query submitting user, the first weighting to be applied to the interest profile of the search authority, and the second weighting to be applied to the interest profile of the query submitting user; and performing the weighted combination in accordance with the identified first and second weightings;

determining, by a processing device, search results in response to the search query based on the combined interest profile; and enabling the query submitting user to perceive the determined search results.

16. The method of claim 15 wherein enabling the query submitting user to specify a first weighting to be applied to the interest profile of the search authority and a second weighting to be applied to the interest profile of the query submitting user comprises enabling the query submitting user to manually select the first weighting and the second weighting through interaction with a graphical user interface.

* * * * *